United States Patent
Phielix et al.

(10) Patent No.: US 11,552,523 B2
(45) Date of Patent: Jan. 10, 2023

(54) CONFORMAL COOLING DEVICES FOR ROTATING GENERATOR ELEMENTS AND ADDITIVE MANUFACTURING PROCESSES FOR FABRICATING THE SAME

(71) Applicant: HONEYWELL INTERNATIONAL INC., Morris Plains, NJ (US)

(72) Inventors: Tom Phielix, Tucson, AZ (US); Donald Godfrey, Phoenix, AZ (US); Erek Walker, Boulder, CO (US); Regina Lockard, Phoenix, AZ (US); Balwinder Birdi, Tucson, AZ (US); Shreyas Iyer, Phoenix, AZ (US); Ben Wilson, Algonquin, IL (US); Todd Coulam, Gilbert, AZ (US); Sean Byrnes, Mesa, AZ (US); Kristen Van Osten, Gilbert, AZ (US)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 301 days.

(21) Appl. No.: 16/886,259

(22) Filed: May 28, 2020

(65) Prior Publication Data

US 2021/0376687 A1 Dec. 2, 2021

(51) Int. Cl.
*H02K 5/20* (2006.01)
*B33Y 80/00* (2015.01)
(Continued)

(52) U.S. Cl.
CPC ................ *H02K 5/20* (2013.01); *B33Y 80/00* (2014.12); *F01B 23/10* (2013.01); *H02K 1/32* (2013.01);
(Continued)

(58) Field of Classification Search
CPC ............ H02K 1/32; H02K 1/325; H02K 5/20; H02K 5/203; H02K 5/207; H02K 9/19; H02K 9/193; H02K 9/197; B33Y 80/00
(Continued)

(56) References Cited

U.S. PATENT DOCUMENTS

| 5,849,238 A | 12/1998 | Schmidt et al. |
| 6,596,224 B1 | 7/2003 | Sachs et al. |

(Continued)

FOREIGN PATENT DOCUMENTS

| EP | 3509193 A1 | 7/2019 |
| GB | 2403605 A | 1/2005 |

(Continued)

OTHER PUBLICATIONS

Machine Translation of KR-1020070027809-A (Year: 2007).*
(Continued)

*Primary Examiner* — Quyen P Leung
*Assistant Examiner* — Christopher S Leone
(74) *Attorney, Agent, or Firm* — Lorenz & Kopf, LLP

(57) ABSTRACT

Electrical generators having one or more conformal support and cooling devices for use in supporting and cooling rotating elements of the generator are disclosed herein. An electrical generator includes a housing, a shaft disposed axially through the housing, a rotor assembly including a plurality of poles that are disposed within the housing and mounted on the shaft, a support wedge disposed between two of the plurality of poles. The conformal support and cooling device includes an internal cooling channel in a helical configuration or a V-shape configuration that extends from a first length-wise end of the support and cooling device to a second length-wise end of the support and
(Continued)

cooling device. Additive manufacturing processes are employed to fabricate the conformal support and cooling device.

13 Claims, 9 Drawing Sheets

(51) Int. Cl.
  *F01B 23/10* (2006.01)
  *H02K 1/32* (2006.01)
  *H02K 7/18* (2006.01)
  *H02K 9/19* (2006.01)
  *H02K 15/14* (2006.01)
(52) U.S. Cl.
  CPC ............. *H02K 7/1823* (2013.01); *H02K 9/19* (2013.01); *H02K 15/14* (2013.01); *F05D 2220/32* (2013.01); *F05D 2220/76* (2013.01)
(58) Field of Classification Search
  USPC .................................. 310/52, 54, 57–59, 61
  See application file for complete search history.

(56) References Cited

U.S. PATENT DOCUMENTS

| | | | |
|---|---|---|---|
| 9,230,726 B1 | 1/2016 | Parker et al. | |
| 9,551,490 B2 | 1/2017 | DiCintio et al. | |
| 10,290,459 B2 | 5/2019 | Raj et al. | |
| 10,366,817 B2 | 7/2019 | Kim et al. | |
| 2003/0048015 A1 | 3/2003 | Tornquist et al. | |
| 2004/0164627 A1* | 8/2004 | Tornquist | H02K 1/325 |
| | | | 310/59 |
| 2016/0352174 A1 | 12/2016 | Huang et al. | |
| 2016/0352201 A1 | 12/2016 | Ranjan et al. | |
| 2017/0043518 A1 | 2/2017 | Narayanaswamy | |
| 2018/0141127 A1 | 5/2018 | Richard | |
| 2018/0272406 A1 | 9/2018 | Saini | |
| 2019/0086154 A1 | 3/2019 | Adriany et al. | |
| 2019/0207452 A1* | 7/2019 | Kuehn | H02K 3/24 |
| 2021/0222566 A1* | 7/2021 | Snider | F01D 11/02 |
| 2021/0226512 A1* | 7/2021 | Broomfield | H02K 9/197 |

FOREIGN PATENT DOCUMENTS

| | | | |
|---|---|---|---|
| GB | 2548629 A | | 3/2016 |
| KR | 1020070027809 A | * | 3/2007 |
| KR | 20200006277 A | | 1/2020 |

OTHER PUBLICATIONS

PROTO3000, "Metal 3D Printing for Tooling Applications," retrieved from: https://proto3000.com/3d-printing/metal-3d-printing-for-tooling-applications/ on Jan. 30, 2020.

Jahan, Suchana Akter, et al. "A Thermomechanical Analysis of Conformal Cooling Channels in 3D Printed Plastic Injection Molds," Applied Science, Dec. 11, 2018, Retrieved from: https://www.mdpi.com/2076-3417/8/12/2567.

* cited by examiner

CONFORMAL COOLING DEVICES FOR ROTATING GENERATOR ELEMENTS AND ADDITIVE MANUFACTURING PROCESSES FOR FABRICATING THE SAME

TECHNICAL FIELD

The present disclosure is generally directed to devices for conductively cooling components of apparatuses that generate heat, and processes for manufacturing the same. More particularly, the present disclosure is directed to conformal cooling devices for use in cooling rotating electrical generator elements, and additive manufacturing processes for manufacturing the same. The disclosed cooling devices find application, for example, in aerospace components, such as power generation and conversion apparatuses of aircraft.

BACKGROUND

Electrical generators are used in many applications, including on gas turbine engines for aircraft, ships, and military vehicles. Such generators typically rotate at relatively high speeds (e.g., about 12,000 r.p.m. to about 24,000 r.p.m. or greater) during operation. Large centrifugal forces may be imposed upon the generator's rotating parts, such as the rotor. Generator rotors typically include a number of poles, each of which is wound with wire conductors, called windings. During operation of the generator, the windings that rotate with the rotor are subjected to these relatively high centrifugal forces. To secure the windings against such centrifugal forces, it is known to mount support structures (commonly referred to as "wedges") between each of the respective poles.

Reference is now made to FIGS. 1-3, which illustrate an exemplary, non-limiting configuration for an electrical generator 10 having a housing 11. The generator 10 includes, for example, within the housing 11 a rotor assembly 12 mounted on a shaft 14, and end caps 16a and 16b for the rotor assembly 12. The end caps 16a and 16b provide structural support and concentricity control to the rotor assembly 12. FIG. 2 illustrates the rotor assembly 12 having an exemplary four poles 18a-18d (pole 18d being hidden from view) that extend radially away from the shaft 14, each of which is wound with windings (not shown). The rotor assembly 12 is defined by a generally cylindrical rotor body with the shaft 14 extending axially through the rotor body, as shown best in FIG. 3. The shaft 14 includes a bore 20 extending from a first end having an opening to a second closed end. A support wedge is mounted in the area between each of the respective poles 18a-18d. The exemplary four-pole rotor assembly 12 illustrated in FIGS. 2 and 3 includes four outer support wedges 24a-24d (24c and 24d not visible) and four inner support wedges 26a-26d (26c and 26d not visible). The end caps 16a and 16b, include an end wall 40 circumferentially surrounded by an annular flange 42. The annular flange 42 projects inwardly from the end wall 40 toward the opposite end cap.

During operation of the generator 10, current passes through the wire windings, thereby generating heat. Some of this heat should be removed from the generator 10, particularly from the windings, to allow efficient operation of the generator 10 and to keep the wire winding temperature below the point where the wire's insulation begins to break down. If an insufficient amount of heat is removed from the generator 10, then the power output from the generator 10 may be limited and the insulation of the wires within the generator 10 may degrade.

Conventional cooling systems such as air or limited conduction may, under certain circumstances, not offer sufficient heat dissipating capacity for high-speed generators. Accordingly, more recently, ends of the outer support wedges 24a-24d may also include a supply port that is open to an axial channel for flow of a cooling medium through the support wedge, for example oil. During operation of the generator 10, the cooling medium flows under pressure through the axial channel and provides conductive cooling. As such, referring back to FIG. 3, outer support wedges 24a-d also include an axial channel 38. A cooling medium flows through the axial channels 38 to provide conductive cooling during operation of the generator 10.

Conventionally, the wedge cooling channels, such as axial channels 38, have been limited in configuration by the constraints of conventional tooling equipment, such as drilling or milling equipment. This conventional tooling equipment is only capable of producing straight-line channels, and they cannot provide any curvature of less than 90 degrees. Accordingly, the conductive cooling provided by these conventional cooling channels may not be optimum. Sub-optimum cooling may result in problems such as limited power generating capacity and shorter component life.

Therefore, it will become apparent to those skilled in the art that there remains a present and continuing need for improved conductive cooling within the support wedges of electrical generators. Particularly, it would be desirable to provide support wedges that have cooling channel configurations that would allow for increased conductive cooling as compared with conventional axial cooling channels. Furthermore, other desirable features and characteristics of the inventive subject matter will become apparent from the subsequent detailed description of the inventive subject matter and the appended claims, taken in conjunction with the accompanying drawings and this background of the disclosure.

BRIEF SUMMARY

Electrical generators having one or more conformal support and cooling devices for use in supporting and cooling rotating elements of the generator, and processes for manufacturing the same, are disclosed herein. In one exemplary embodiment, an electrical generator includes a housing, a shaft disposed axially through the housing, a rotor assembly including a plurality of poles that are disposed within the housing and mounted on the shaft, a support wedge disposed between two of the plurality of poles. The conformal support and cooling device includes an internal cooling channel in a helical configuration that extends from a first length-wise end of the support and cooling device to a second length-wise end of the support and cooling device. Additive manufacturing processes are employed to fabricate the conformal support and cooling device.

In another exemplary embodiment, an electrical generator includes a housing, a shaft disposed axially through the housing, a rotor assembly including a plurality of poles that are disposed within the housing and mounted on the shaft, a support wedge disposed between two of the plurality of poles. The conformal support and cooling device includes an internal cooling channel in a V-shaped configuration that extends from a first length-wise end of the support and cooling device to a second length-wise end of the support and cooling device. Additive manufacturing processes are employed to fabricate the conformal support and cooling device.

In yet another exemplary embodiment, a process for manufacturing a support and cooling device for use in an electrical generator includes the step of providing a three-dimensional design for the support and cooling device. The three-dimensional design includes a polyhedron wedge configuration including three length-wise extending sides and a triangular end portion disposed at each of a first and a second length-wise end of the support and cooling device, and an internal cooling channel in a helical or V-shaped configuration that extends from the first length-wise end of the support and cooling device to the second length-wise end of the support and cooling device. The process further includes the step of manufacturing the support and cooling device using an additive manufacturing technique based on the three-dimensional design.

This brief summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE FIGURES

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Unless specifically stated or obvious from context, as used herein, the term "about" is understood as within a range of normal tolerance in the art, for example within 2 standard deviations of the mean. "About" can be understood as within 10%, 5%, 1%, 0.5%, 0.1%, 0.05%, or 0.01% of the stated value. Unless otherwise clear from the context, all numerical values provided herein are modified by the term "about."

Embodiments of the present disclosure provide conformal cooling devices for use in cooling rotating electrical generator elements, and processes for manufacturing the same. The conformal cooling devices may be embodied as support wedges that both secure the windings of the rotor assembly of the generator against centrifugal forces and provide conductive cooling. The support wedges may include cooling channels through which a cooling medium flows, and the cooling channels may be provided in non-axial configurations that optimize conductive cooling. The support wedges may be manufactured using additive manufacturing technologies to accomplish the non-axial configurations, which would otherwise not be possible using conventional tooling and milling equipment.

Figure 1:
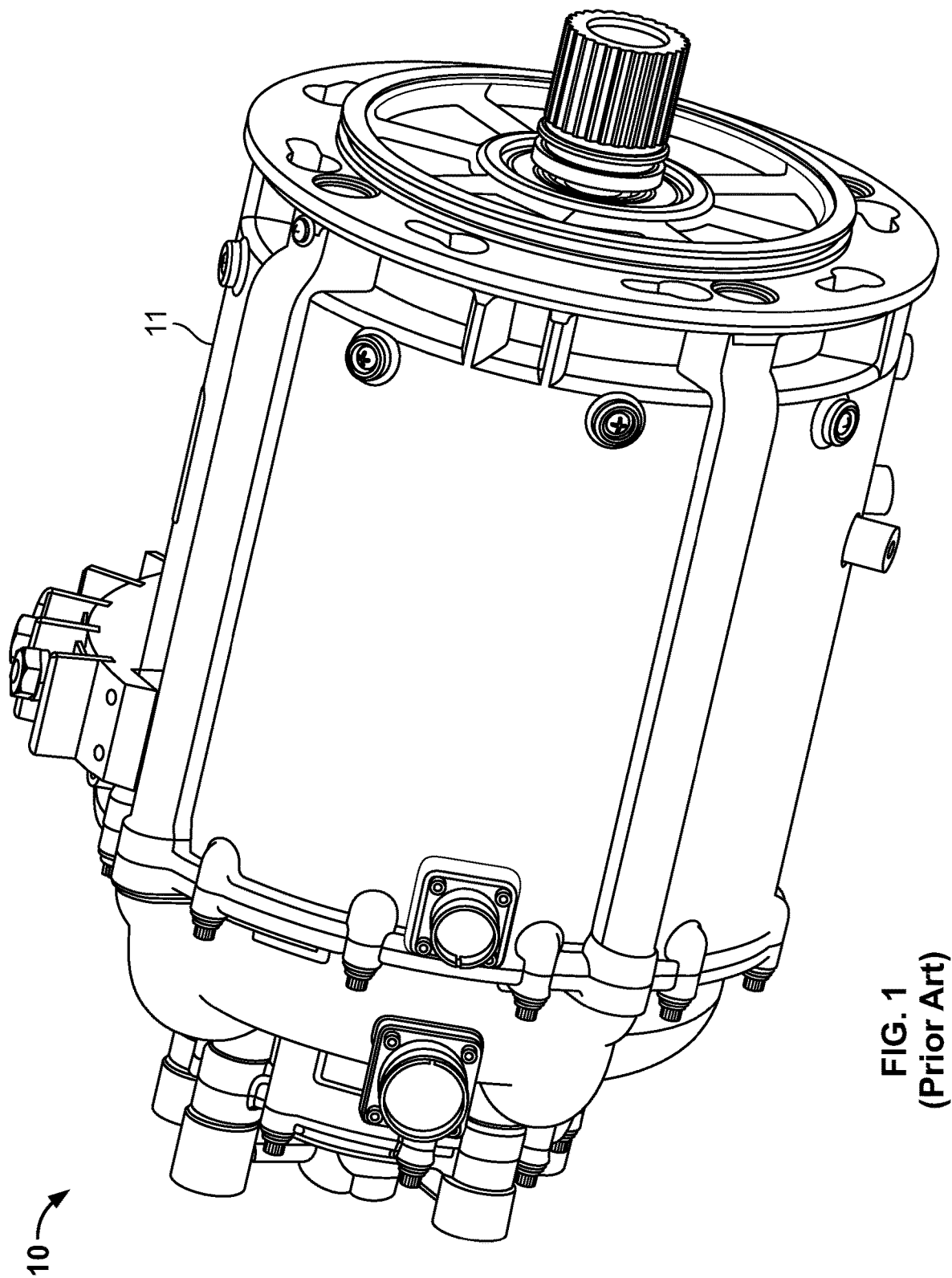
FIG. 1 is a perspective view of an electrical generator known in the prior art.
Figure 2:
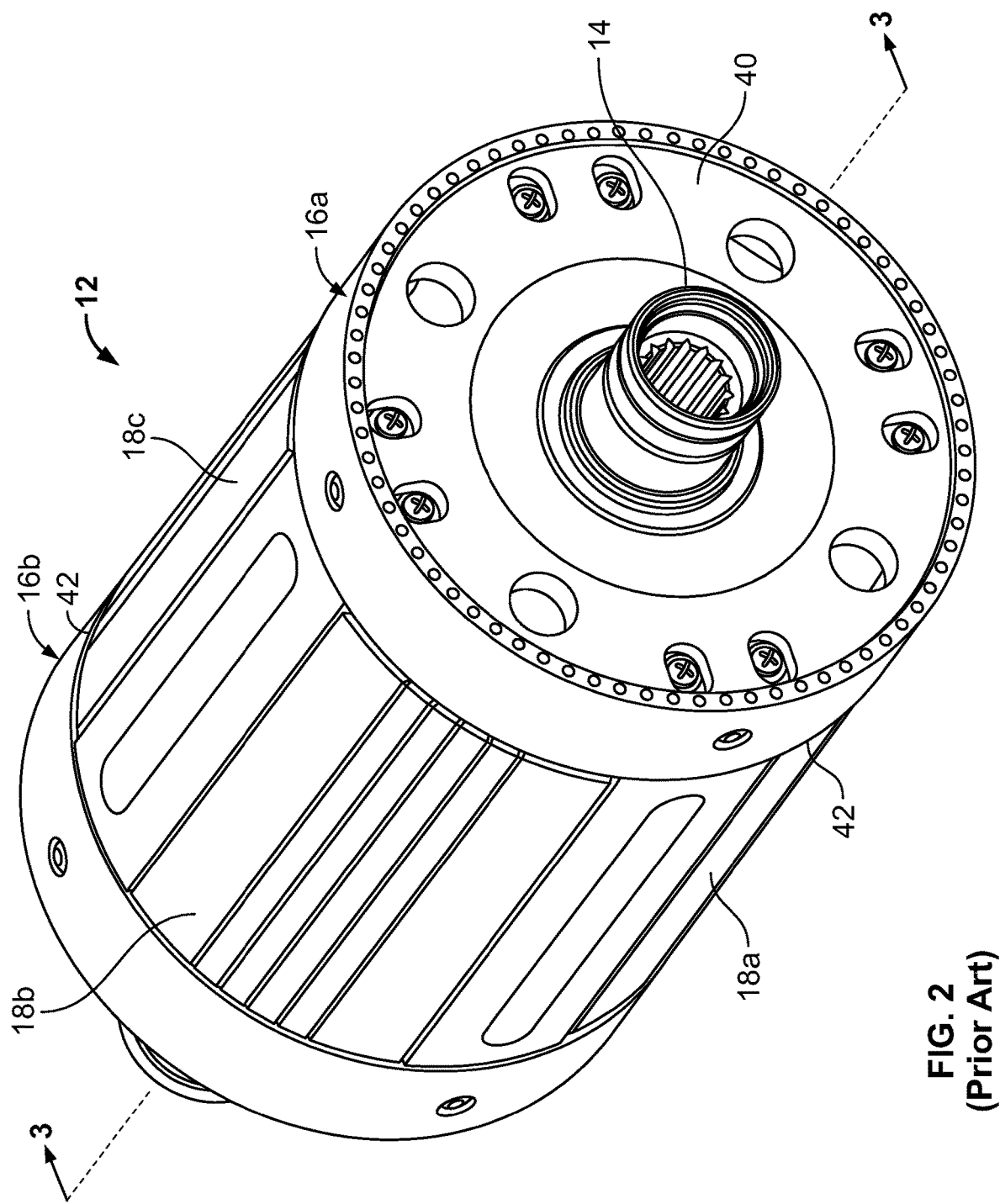
FIG. 2 is a perspective view of a rotor assembly mounted on a shaft of the electrical generator of FIG. 1.
Figure 3:
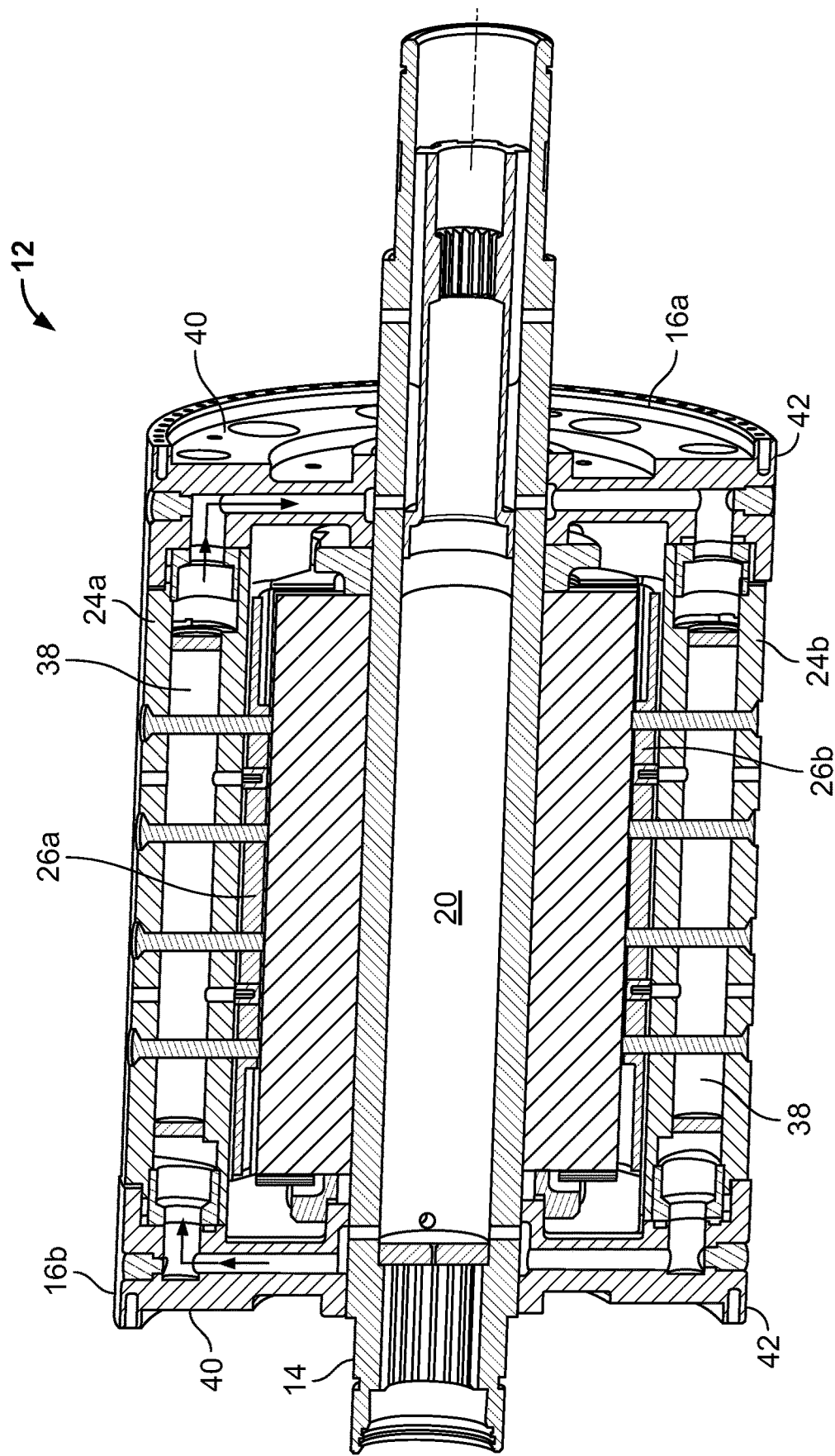
FIG. 3 s a cross-sectional view of the rotor assembly of FIG. 2 taken along the lines 3-3 of FIG. 2.
Figure 4:
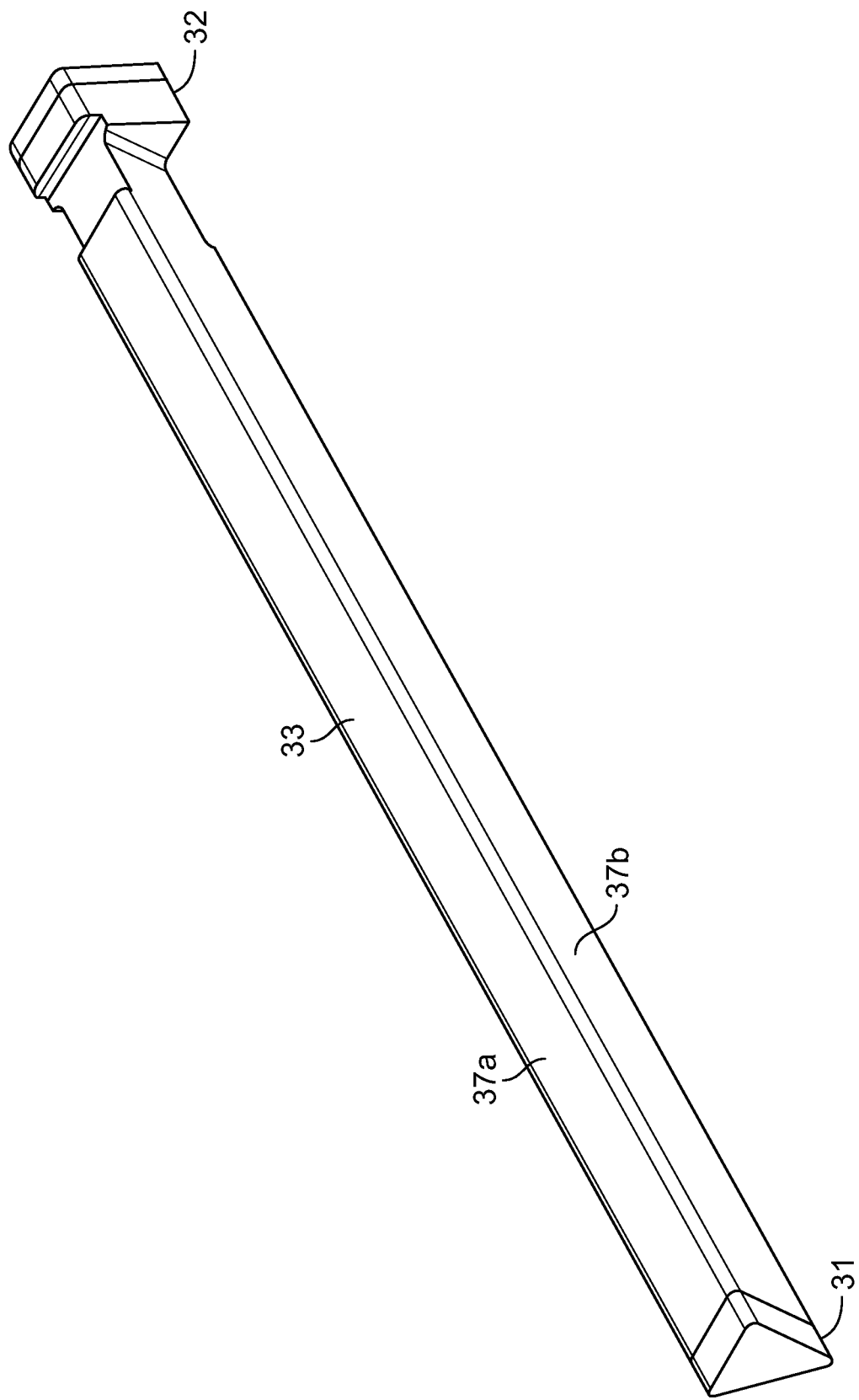
FIG. 4 is a perspective view of a support wedge for use in a rotor assembly of an electrical generator in accordance with embodiments of the present disclosure.

FIG. 4 illustrates an exemplary support wedge 24, for example embodied as an outer support wedge, having an end piece 31 at a first end, an end piece 32 at a second end, and an intermediate portion 33 that houses a cooling channel (not visible) disposed between end pieces 31 and 32. The intermediate portion 33 is, in the illustrated example, configured as a polyhedron having three length-wise extending sides 37a-37c (37c not visible) between two triangular ends adjacent to end pieces 31 and 32. The length of the length-wise extending sides 37a-37c generally depends on the size of the generator in which the support wedge 24 is employed, but should be of sufficient length to provide adequate support and cooling to the rotor assembly. Likewise, the dimensions of the triangular ends adjacent to end pieces 31 and 32 will depend on the internal configuration and spacing requirements of the rotor assembly. The support wedge 24 may be made of a conductive material, for example a conductive metal alloy.

Figure 5A:
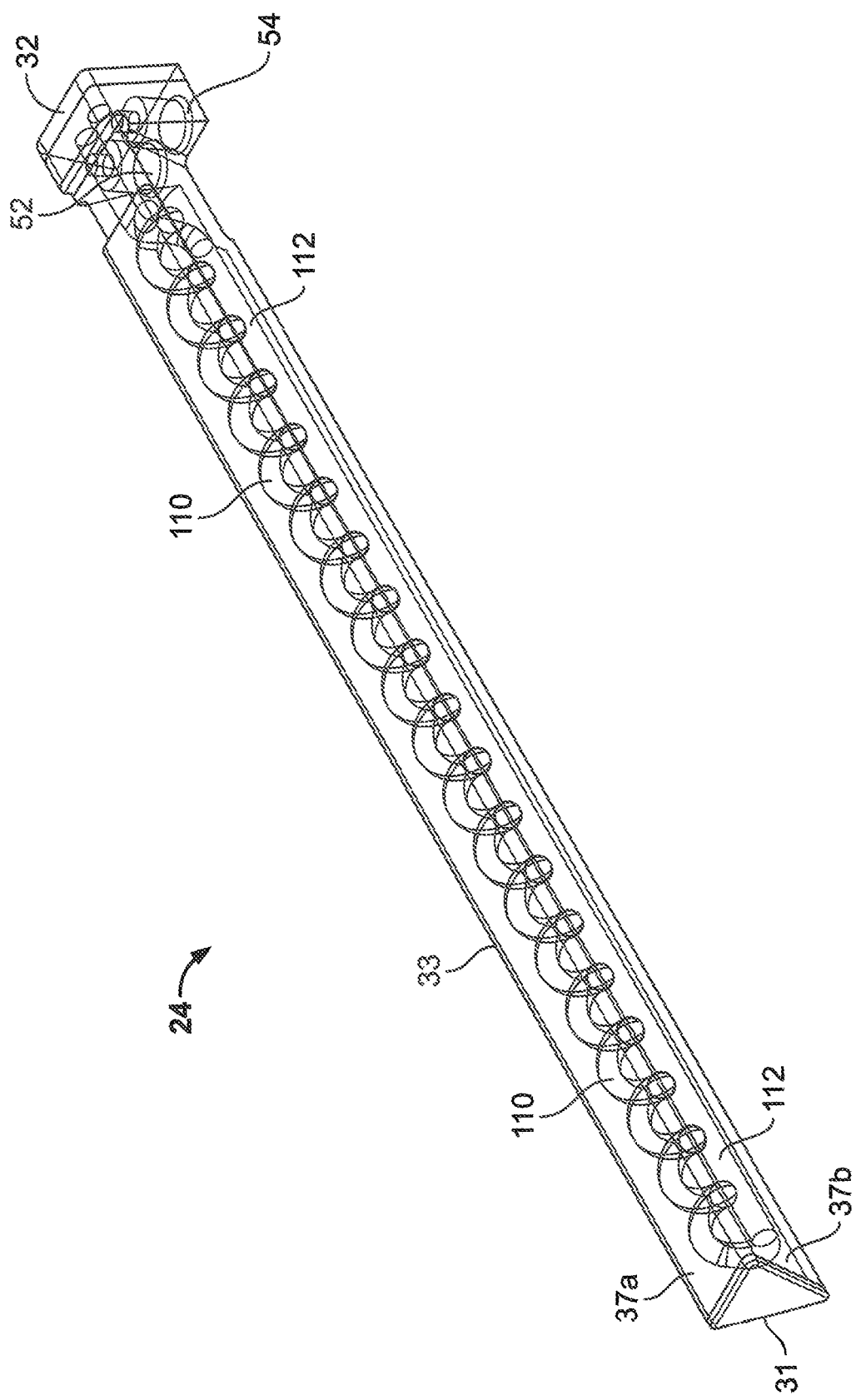
FIGS. 5A-5C are cut-away, width-wise cross-sectional, and length-wise cross-sectional views, respectively, of a support wedge having a conformal cooling channel in accordance with some embodiments of the present disclosure.
Figure 5B:
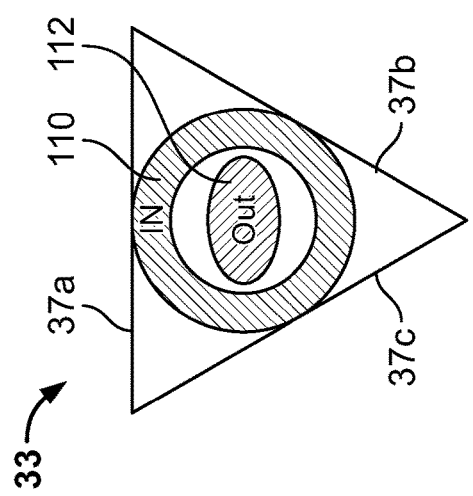
Figure 5C:
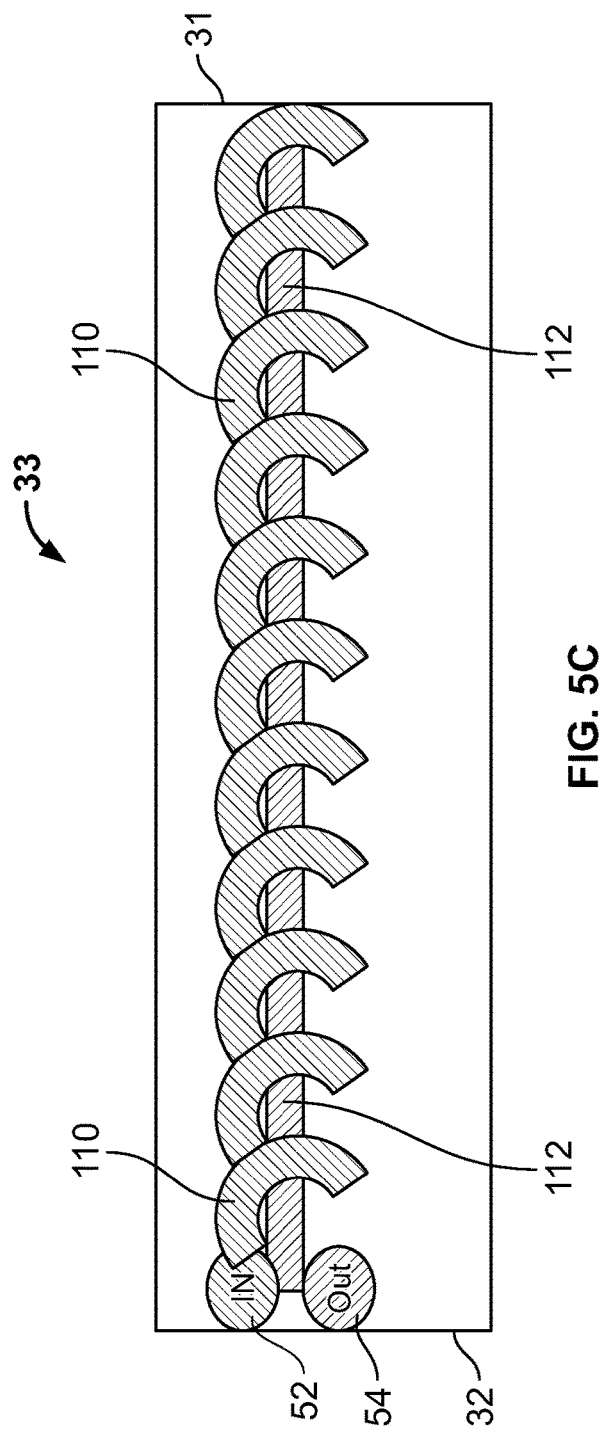

Referring now to FIGS. 5A-5C, which respectively illustrate cut-away, width-wise cross-sectional, and length-wise cross-sectional views of a support wedge 24 in accordance with a first embodiment of the present disclosure, the second end piece 32 includes paired openings 52 and 54, which are configured as entrance and exits openings, respectively, for a cooling medium that circulates within the support wedge 24. The cooling medium can be any lubricating or hydraulic fluid. An exemplary cooling medium is oil because the cooling medium also serves to lubricate bearings in these same generators. The entrance opening 52 is fluidly coupled with a conformal, helically-shaped cooling channel 110. The helically-shaped cooling channel 110 extends length-wise within the intermediate portion 33 between the first and second end pieces 31, 32. The helically-shaped cooling channel 110 may have helixes of constant pitch lengths, or alternatively the pitch lengths may vary along the intermediate portion 33. The helically-shaped cooling channel 110 may have a constant cross-sectional diameter, or alternatively the diameter may vary along the intermediate portion 33.

As the helically-shaped cooling channel 110 extends length-wise through the intermediate portion 33, it becomes most proximate to each of the length-wise extending sides 37a-37c in successive and then repeating fashion, thereby providing cooling that more closely "conforms" to the shape of the support wedge 24, as compared with the axial cooling channels of the prior art (which have a constant, though less proximate, distance from each side 37a-37c along the length of the intermediate portion 33). This conformal configuration provides improved conductive cooling to the support wedge 24. Also provided within the intermediate portion 33 is a cooling medium return channel 112. The cooling medium return channel 112 extends from the terminus of the helically-shaped cooling channel 110 adjacent to the first end to the exit opening 54 within the second end piece 32 at the second end. The cooling medium return channel 112 may have a circular or oval cross-section, for example. The cooling medium return channel 112 may be configured as a substantially axial channel that extends through the helically-shaped cooling channel 110, as best shown in FIG. 5B. During operation of the electrical generator, pressurized cooling medium is directed through the entrance opening 52 into the helically-shaped cooling channel 110 to provide cooling to the support wedge 24. The heated cooling medium is then returned via the return channel 112 and leaves the support wedge 24 via the exit opening 54.

Figure 6A:
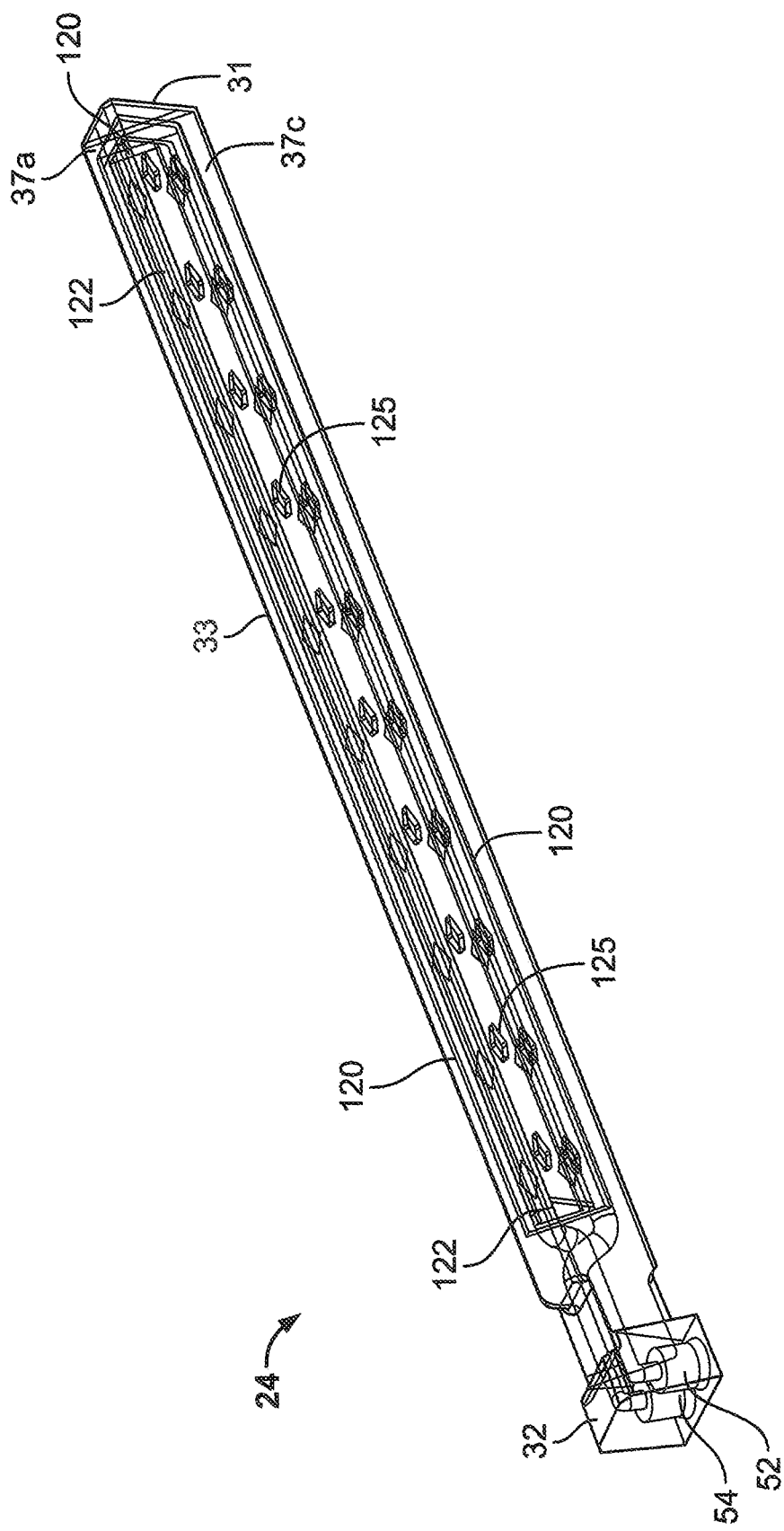
FIGS. 6A-6C are cut-away, width-wise cross-sectional, and length-wise cross-sectional views, respectively, of a support wedge having a conformal cooling channel in accordance with further embodiments of the present disclosure.
Figure 6B:
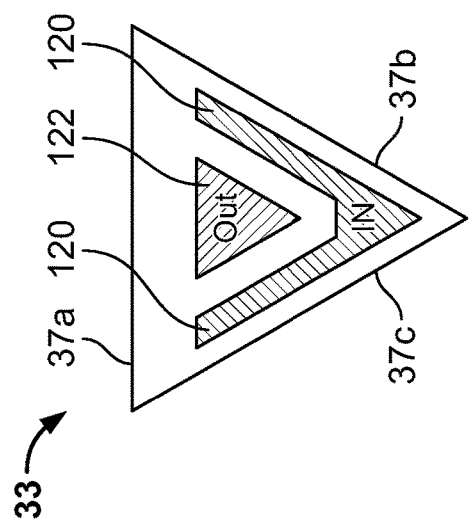
Figure 6C:
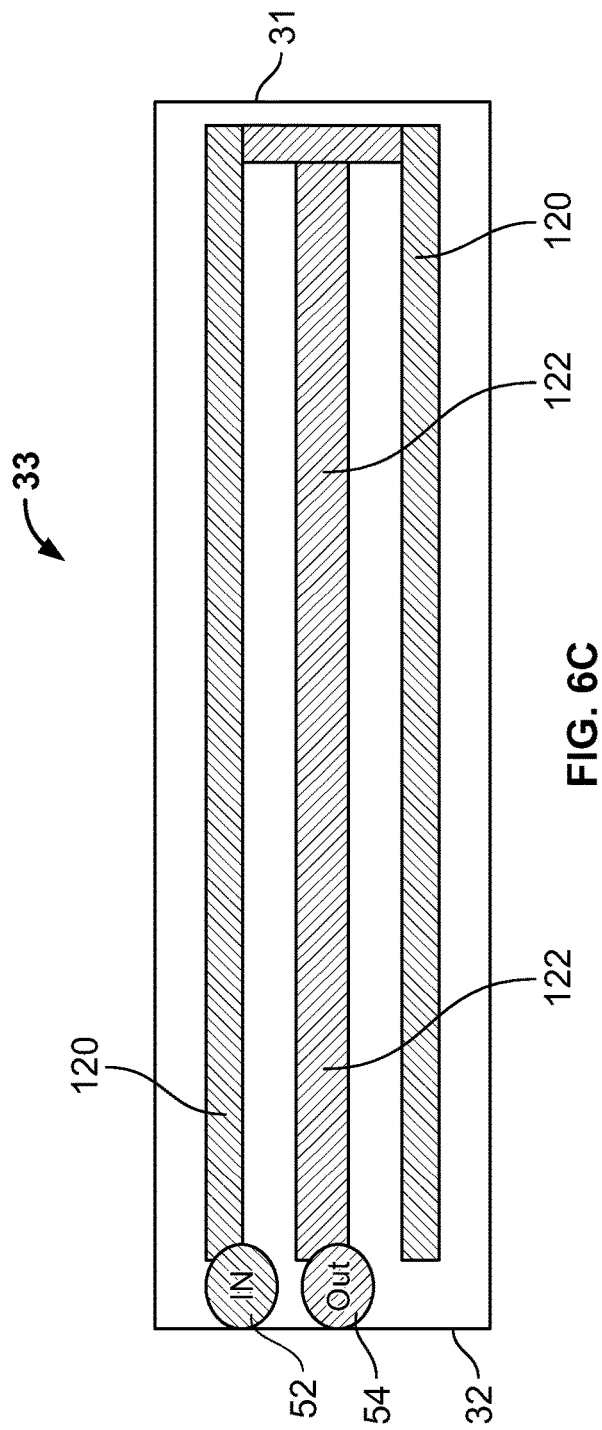

Referring now to FIGS. 6A-6C, which respectively illustrate cut-away, width-wise cross-sectional, and length-wise cross-sectional views of a support wedge 24 in accordance with a second embodiment of the present disclosure, the second end piece 32 includes paired openings 52 and 54, which are configured as entrance and exits openings, respectively, for a cooling medium that circulates within the support wedge 24, as described with regard to the first embodiment. The entrance opening 52 is fluidly coupled with a conformal, V-shaped cooling channel 120. The V-shaped cooling channel 120 extends length-wise within the intermediate portion 33 between the first and second end pieces 31, 32. The V-shaped cooling channel 120 may have two polyhedron portions that extend along sides 37b and 37c proximate thereto, connected with one another at a vertex proximate to the vertex between sides 37b and 37c, as best illustrated in FIG. 6B. The widths of the polyhedron portions may be constant, or they may vary along the intermediate portion 33. Additionally, the V-shaped cooling channel 120 may be provided with a plurality of turbulator features 125, which aid cooling through increased convection within the cooling medium.

As the V-shaped cooling channel 120 extends length-wise through the intermediate portion 33, it remains consistently proximate to each of the length-wise extending sides 37b and 37c, thereby providing cooling that more closely "conforms" to the shape of the support wedge 24, as compared with the axial cooling channels of the prior art (which have a less proximate distance from each side 37a-37c along the length of the intermediate portion 33). This conformal configuration provides improved conductive cooling to the support wedge 24. Also provided within the intermediate portion 33 is a cooling medium return channel 122. The cooling medium return channel 122 extends from the terminus of the V-shaped cooling channel 120 adjacent to the first end to the exit opening 54 within the second end piece 32 at the second end. The cooling medium return channel 122 may have a triangular cross-section, for example. The cooling medium return channel 122 may be configured as a substantially axial channel that extends within the V-shaped cooling channel 120 (i.e., between the two polyhedron portions), as best shown in FIGS. 6B and 6C. During operation of the electrical generator, pressurized cooling medium is directed through the entrance opening 52 into the V-shaped cooling channel 120 to provide cooling to the support wedge 24. The heated cooling medium is then returned via the return channel 122 and leaves the support wedge 24 via the exit opening 54.

Figure 7:
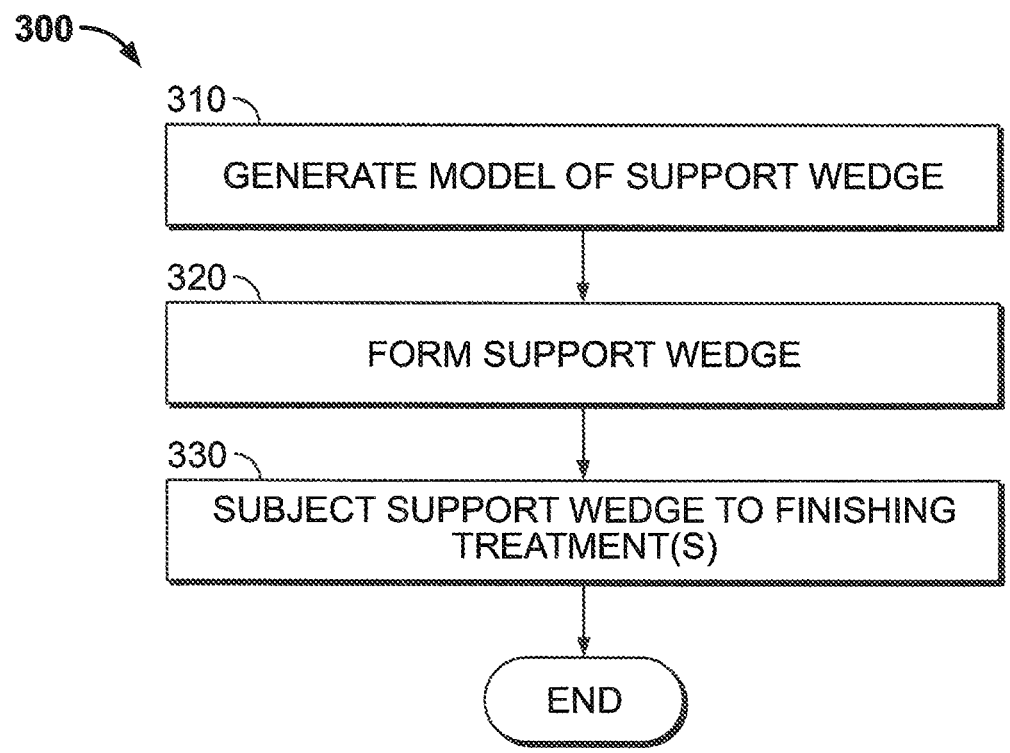
FIG. 7 provides a flowchart illustrating a method for manufacturing a support wedge using additive manufacturing techniques in accordance with an exemplary embodiment of the present disclosure.

As initially noted above, the above-described support wedges 24 in accordance with the present disclosure are suited for manufacture using additive manufacturing techniques. As such, in accordance with an exemplary embodiment, FIG. 7 provides a flowchart illustrating a method 300 for manufacturing a support wedge 24 using, in whole or in part, powder bed additive manufacturing techniques based on various high energy density energy beams. In a first step 310, a model, such as a design model, of the support wedge 24 may be defined in any suitable manner. For example, the model may be designed with computer aided design (CAD) software and may include three-dimensional ("3D") numeric coordinates of the entire configuration of the support wedge 24 including both external and internal surfaces. In one exemplary embodiment, the model may include a number of successive two-dimensional ("2D") cross-sectional slices that together form the 3D support wedge 24.

In step 320 of the method 300, the support wedge 24 is formed according to the model of step 310. In one exemplary embodiment, a portion of the support wedge 24 is formed using a rapid prototyping or additive layer manufacturing process. In other embodiments, the entire support wedge 24 is formed using a rapid prototyping or additive layer manufacturing process. It should be noted that the first and second end pieces 31, 32 and the intermediate portion 33 may be fabricated as an integral structure (i.e., having no mechanical fastening means, welding, brazing, soldering, or the like) using this additive manufacturing process, which eliminates a potential failure point that may be encountered in prior art configurations that are not integral.

Some examples of additive layer manufacturing processes include: direct metal laser sintering (DMLS), in which a laser is used to sinter a powder media in precisely controlled locations; laser wire deposition in which a wire feedstock is melted by a laser and then deposited and solidified in precise locations to build the product; electron beam melting; laser engineered net shaping; and selective laser melting. In general, powder bed additive manufacturing techniques provide flexibility in free-form fabrication without geometric constraints, fast material processing time, and innovative joining techniques. In one particular exemplary embodiment, DMLS is used to produce the support wedge 24 in step 320. DMLS is a commercially available laser-based rapid prototyping and tooling process by which complex parts may be directly produced by precision sintering and solidification of metal powder into successive layers of larger structures, each layer corresponding to a cross-sectional layer of the 3D component.

As such, in one exemplary embodiment, step 320 is performed with DMLS techniques to form the support wedge 24. However, prior to a discussion of the subsequent method steps of FIG. 7, reference is made to FIG. 8, which is a schematic view of a DMLS system 400 for manufacturing the support wedge 24.

Figure 8:
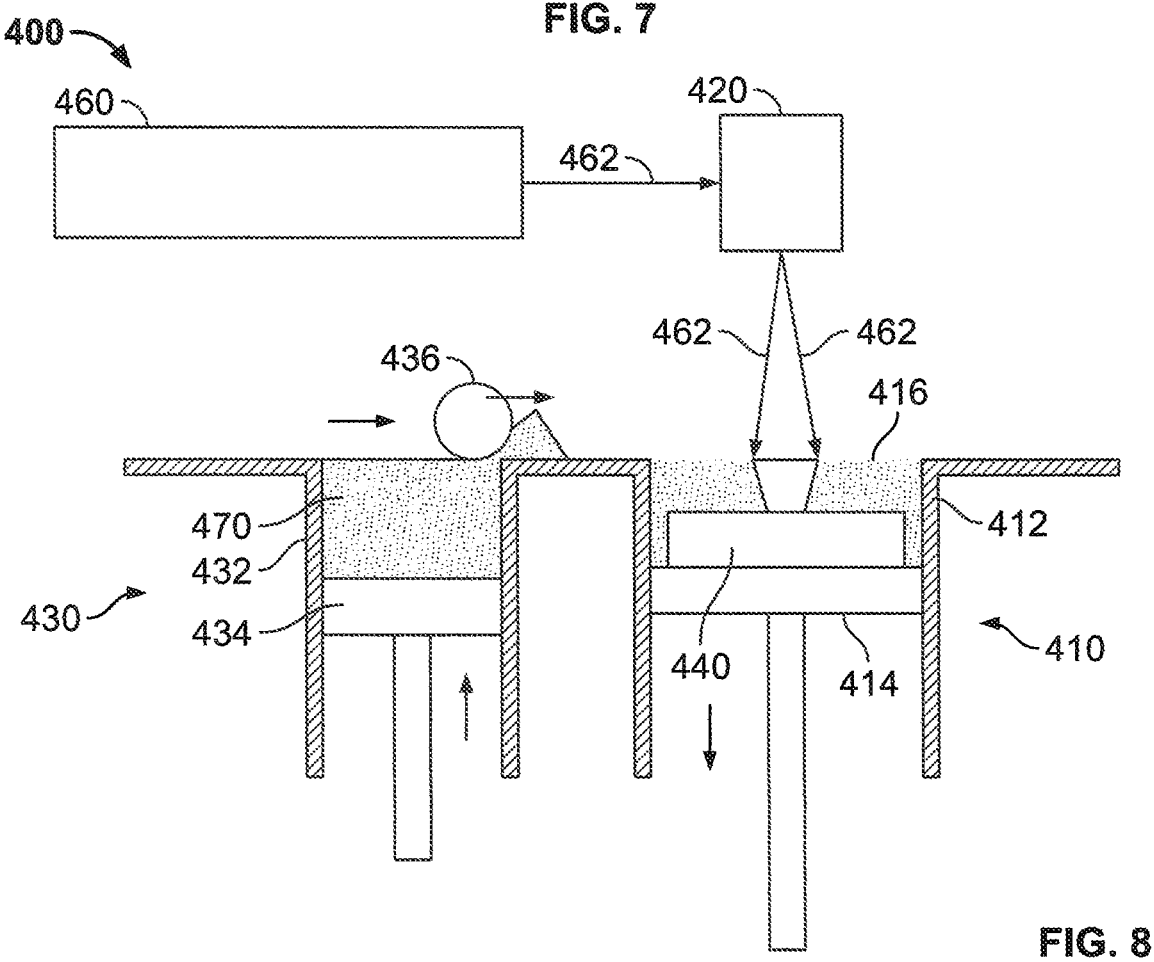
FIG. 8 is a schematic view of a powder bed additive manufacturing system for manufacturing the support wedge in accordance with an exemplary embodiment of the present disclosure.

Referring to FIG. 8, the system 400 includes a fabrication device 410, a powder delivery device 430, a scanner 420, and a low energy density energy beam generator, such as a laser 460 (or an electron beam generator in other embodiments) that function to manufacture the support wedge 24 with build material 470. The fabrication device 410 includes a build container 412 with a fabrication support 414 on which the support wedge 24 is formed and supported. The fabrication support 414 is movable within the build container 412 in a vertical direction and is adjusted in such a way to define a working plane 416. The delivery device 430 includes a powder chamber 432 with a delivery support 434 that supports the build material 470 and is also movable in the vertical direction. The delivery device 430 further includes a roller or wiper 436 that transfers build material 470 from the delivery device 430 to the fabrication device 410.

During operation, a base block 440 may be installed on the fabrication support 414. The fabrication support 414 is lowered and the delivery support 434 is raised. The roller or wiper 436 scrapes or otherwise pushes a portion of the build material 470 from the delivery device 430 to form the working plane 416 in the fabrication device 410. The laser 460 emits a laser beam 462, which is directed by the scanner 420 onto the build material 470 in the working plane 416 to selectively fuse the build material 470 into a cross-sectional layer of the support wedge 24 according to the design. More specifically, the speed, position, and other operating parameters of the laser beam 462 are controlled to selectively fuse the powder of the build material 470 into larger structures by rapidly melting the powder particles that may melt or diffuse into the solid structure below, and subsequently, cool and re-solidify. As such, based on the control of the laser beam 462, each layer of build material 470 may include un-fused and fused build material 470 that respectively corresponds to the cross-sectional passages and walls that form the support wedge 24. In general, the laser beam 462 is relatively low power, but with a high energy density, to selectively fuse the individual layer of build material 470. As an example, the laser beam 462 may have a power of approximately 50 to 500 Watts, although any suitable power may be provided.

Upon completion of a respective layer, the fabrication support 414 is lowered and the delivery support 434 is raised. Typically, the fabrication support 414, and thus the support wedge 24, does not move in a horizontal plane during this step. The roller or wiper 436 again pushes a portion of the build material 470 from the delivery device 430 to form an additional layer of build material 470 on the working plane 416 of the fabrication device 410. The laser beam 462 is movably supported relative to the support wedge 24 and is again controlled to selectively form another cross-sectional layer. As such, the support wedge 24 is positioned in a bed of build material 470 as the successive layers are formed such that the un-fused and fused material supports subsequent layers. This process is continued according to the modeled design as successive cross-sectional layers are formed into the completed desired portion, e.g., the support wedge 24 of step 320.

The delivery of build material 470 and movement of the support wedge 24 in the vertical direction are relatively constant and only the movement of the laser beam 462 is selectively controlled to provide a simpler and more precise implementation. The localized fusing of the build material 470 enables more precise placement of fused material to reduce or eliminate the occurrence of over-deposition of material and excessive energy or heat, which may otherwise result in cracking or distortion. The unused and un-fused build material 470 may be reused, thereby further reducing scrap. Any suitable laser and laser parameters may be used, including considerations with respect to power, laser beam spot size, and scanning velocity.

Returning to FIG. 7, at the completion of step 320, the support wedge 24 is removed from the powder bed additive manufacturing system (e.g., from the DMLS system 400) and then may be given a stress relief treatment. In step 330, the support wedge 24 formed in step 320 may undergo finishing treatments. Additionally, encapsulation of the support wedge 24 may be performed in some embodiments as part of step 330. The encapsulation layer functions to effectively convert any surface porosity and cracks into internal porosity and cracks, and after the application of pressure and heat, removes or reduces the porosity and cracks. Such encapsulation layers may be subsequently removed or maintained to function as an oxidation protection layer. Other finishing treatments that may be performed as a part of step 330 include aging, quenching, peening, polishing, or applying coatings. Further, if necessary, machining may be performed on the support wedge 24 to achieve a desired final shape.

As such, described herein are embodiments of improved support wedge structures that provide stability and conductive cooling within rotor assembly of electrical generators, and processes for manufacturing the same. The inventive support wedge structures have cooling channel configurations that are conformal to the side walls of the support wedge structures that allow for increased conductive cooling as compared with conventional axial cooling channels. Beneficially, these cooling channel configurations may be manufactured using modern additive manufacturing techniques. The described embodiments allow for a more efficient operation of the electrical generators in which they are employed, as well as providing a longer service life.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope as set forth in the appended claims and their legal equivalents.

What is claimed is:

1. An electrical generator comprising:
   a housing;
   a shaft disposed axially through the housing;
   a rotor assembly comprising a plurality of poles that are disposed within the housing and mounted on the shaft; and
   a conformal support and cooling device disposed between two of the plurality of poles,
   wherein:
   the conformal support and cooling device comprises an internal cooling channel in a helical configuration that extends from a first length-wise end of the conformal support and cooling device to a second length-wise end of the conformal support and cooling device,
   the conformal support and cooling device comprises first and second openings positioned at the second length-wise end of the conformal support and cooling device,
   the helical internal cooling channel is fluidly coupled with the first opening at the second length-wise end of the conformal support and cooling device, and
   the conformal support cooling device further comprises an axial cooling medium return channel extending through the helical internal cooling channel from a terminus of the helical internal cooling channel adjacent to the first length-wise end of the conformal support and cooling device to the second opening at the second length-wise end of the conformal support and cooling device.

2. The electrical generator of claim 1, wherein the conformal support and cooling device is provided in a polyhedron wedge configuration.

3. The electrical generator of claim 2, wherein the polyhedron wedge configuration comprises three length-wise extending sides and a triangular end portion disposed at each of the first and second length-wise ends of the conformal support and cooling device.

4. The electrical generator of claim 3, wherein the helical internal cooling channel is proximate to each of the length-wise extending sides in successive and repeating configuration along the length of the conformal support and cooling device.

5. The electrical generator of claim 1, further comprising a fluid cooling medium within the helical internal cooling channel.

6. The electrical generator of claim 1 comprising at least four poles and at least four conformal support and cooling devices, each respective conformal support and cooling device being disposed between two of the at least four poles.

7. A gas turbine engine coupled with the electrical generator of claim 1.

8. An electrical generator comprising:
a housing;
a shaft disposed axially through the housing;
a rotor assembly comprising a plurality of poles that are disposed within the housing and mounted on the shaft; and
a conformal support and cooling device disposed between two of the plurality of poles,
wherein:
the conformal support and cooling device comprises an internal cooling channel in a V-shaped configuration that extends from a first length-wise end of the support and cooling device to a second length-wise end of the support and cooling device,
the conformal support and cooling device comprises first and second openings positioned at the second length-wise end of the conformal support and cooling device,
the V-shaped internal cooling channel is fluidly coupled with the first opening at the second length-wise end of the conformal support and cooling device, and
the conformal support and cooling device further comprises an axial cooling medium return channel extending through the V-shaped internal cooling channel from a terminus of the helical internal cooling channel adjacent to the first length-wise end of the conformal support and cooling device to the second opening at the second length-wise end of the conformal support and cooling device.

9. The electrical generator of claim 8, wherein the conformal support and cooling device is provided in a polyhedron wedge configuration.

10. The electrical generator of claim 9, wherein the polyhedron wedge configuration comprises three length-wise extending sides and a triangular end portion disposed at each of the first and second length-wise ends of the conformal support and cooling device.

11. The electrical generator of claim 10, wherein V-shaped internal cooling channel comprises two length-wise extending polyhedrons connected at a vertex that are proximate to two of the length-wise extending sides along the length of the conformal support and cooling device.

12. The electrical generator of claim 8, further comprising a fluid cooling medium within the V-shaped internal cooling channel.

13. A gas turbine engine coupled with the electrical generator of claim 8.

* * * * *